United States Patent [19]
Niemi

[11] Patent Number: 5,428,527
[45] Date of Patent: Jun. 27, 1995

[54] METHOD AND DEVICE FOR THE CONSIDERATION OF VARYING VOLUME AND FLOW IN THE CONTROL OF A CONTINUOUS FLOW PROCESS

[76] Inventor: Antti J. Niemi, Yrjo Liipolantie 5, SF-02700 Kauniainenn, Finland

[21] Appl. No.: 920,436
[22] PCT Filed: Dec. 28, 1990
[86] PCT No.: PCT/FI90/00315
 § 371 Date: Aug. 25, 1992
 § 102(e) Date: Aug. 25, 1992
[87] PCT Pub. No.: WO91/10177
 PCT Pub. Date: Jul. 11, 1991

[30] Foreign Application Priority Data
 Dec. 28, 1989 [FI] Finland ................................ 896298

[51] Int. Cl.$^6$ .............................................. G05B 13/02
[52] U.S. Cl. .................................... 364/152; 364/500; 364/510
[58] Field of Search ............... 364/152, 509, 510, 500, 364/501, 502, 503, 160; 55/106, 5, 210; 137/209, 2, 1–6, 87, 88, 101.25, 101.31, 624.11, 563; 73/149; 210/662, 744; 604/65, 67, 82; 366/132; 417/26, 28

[56] References Cited

U.S. PATENT DOCUMENTS

| | | |
|---|---|---|
| 4,358,821 | 11/1982 | Niemi . |
| 4,380,317 | 4/1983 | Ryan .................................. 364/500 |
| 4,385,992 | 5/1983 | Claver et al. ...................... 210/662 |
| 4,560,323 | 12/1985 | Orchard ............................. 417/27 |
| 4,592,743 | 6/1986 | Hjertman et al. ................. 604/82 |
| 4,808,161 | 2/1989 | Kamen ............................... 604/67 |
| 4,826,482 | 5/1989 | Kamen ............................... 604/67 |
| 4,854,713 | 8/1989 | Soechtig ............................ 366/132 |
| 4,999,117 | 3/1991 | Palmu et al. ...................... 210/744 |
| 5,032,154 | 7/1991 | Wrisht ................................ 55/5 |
| 5,122,162 | 6/1992 | Krismont et al. ................. 55/5 |
| 5,133,280 | 7/1992 | Kubo ................................. 137/209 |
| 5,161,100 | 11/1992 | Whipple ............................ 364/160 |
| 5,193,990 | 3/1993 | Kamen et al. ..................... 417/474 |
| 5,349,852 | 9/1994 | Kamen et al. ..................... 364/510 |

OTHER PUBLICATIONS

A. J. Niemi, *Mathematical and Computer Modeling*, vol. 11. pp. 32–37, (1988).
Niemi, "Process Dynamic Approach to pH Control," *Proc. ISA Conf.*, Part II, pp.63–68, 1978.

Primary Examiner—James P. Trammell
Attorney, Agent, or Firm—Foley & Lardner

[57] ABSTRACT

The control method is directed to a quality characteristic of the process material, typically to its outlet concentration. In control of the actuator which is a part of feedforward or feedback control of outlet concentration, one takes account of changes of the material volume and flow, in addition to the inlet concentration or control deviation. With this object, at least two of the quantities of inlet flow, outlet flow and material volume are measured or determined and by means of them a variable is further determined with regard to which the control method is invariant. Two alternative variables are presented, one being typically applicable to control of a process with finite distribution of the flow velocity and the other to control of a process with vigorous mixing. By means of a time-variable control method, the controls can also be implemented with time as the independent variable. The invention also relates to devices which implement the control methods presented.

14 Claims, 1 Drawing Sheet

METHOD AND DEVICE FOR THE CONSIDERATION OF VARYING VOLUME AND FLOW IN THE CONTROL OF A CONTINUOUS FLOW PROCESS

BACKGROUND OF THE INVENTION

1. Field of the Invention

The present invention relates to a control method which takes account of changes occurring in the material volume and mass flow of a process to be controlled, at the manipulation of an actuator, like a control valve, for control of another process quantity. The invention also relates to an apparatus for implementing the method.

2. Description of the Related Art

In control of the concentration or other quantity which describes the instantaneous state of the process material, changes of the amount of material contained in the process and changes of the material flow make the control task difficult. For observation of variation of the continuous flow, a method and the corresponding apparatus have been disclosed earlier, and they have received a patent in Finland (59494), United Kingdom (2051424) and U.S. Pat. No. 4,358,821. In the referred patent documents, common disturbances and changes of flow and the benefit gained through their observation are illustrated by examples. In the method disclosed, the material volume of the process has been considered constant and thereby one has completely ignored its possible variation, the disturbances caused by this and incorporation of its variation in control of other process quantities. On the basis of the above method, one cannot either make any obvious conclusions on how changes of material volume could be taken into account in the pursuance of better control results.

However, the amount of material, like the volume of a liquid, varies often in the industrial equipment. Typical examples of this are buffer vessels charged with the task of decreasing the changes which are present in both the quality and the flow of the incoming material. In such a case, both the material volume and flow, in addition to the input concentration, affect the concentrations in the output channel.

The controllers of a production process of variable volume have to be tuned for the worst case occurring in the practice., If e.g. the process exhibits a time delay which is essentially dependent on the volume, the feedback controller of concentration has to be tuned for the greatest volume present in practice. This is so, because the control would get worse and the control loop could run into a state of oscillation, if the volume could become greater than the volume under tuning conditions.

The applicant is not informed of examples of cases in which the variable volume would have been incorporated in control of material properties, the less so of cases in which both the volume and flow would have been incorporated. It may be possible to construct such a control system by means of conventional control components whereby the system would consist of e.g. cascade control loops. An inaccurate operation would be characteristic of such a controller including the fact that the control parameters would almost always deviate from their optimal values.

SUMMARY OF THE INVENTION

The aim of the prevent invention is, therefore, to provide a method and apparatus for process control which takes the changes of process volume and flow into account. The invention expands the conventional, known control methods and apparatuses with this feature. Its principal characteristics appear from the patent claims enclosed. In particular, the inventive apparatus used for feedback control may typically be a proportional, integral and derivative controller whereby it incorporates an improvement with regard to the conventional PID controller in that it performs its duties equally well whether the volume and flow are varied or kept constant, while the operation of a loop provided with a conventional PID controller becomes worse, if the volume and flow deviate from the constant values corresponding to the conditions of tuning of the controller.

A basis of the invention is the observation of the fact that, at a change of the liquid volume, the input and output flows or at least one of these must change. The concentration dynamics of a vessel do not therefore depend unambiguously on the volume. Corresponding to this, the control of the output concentration has to take account of at least two disturbance quantities, while the input concentration is considered the controlling quantity. This is not possible with previously known methods. The controller of the present invention is different; from the controller according to the earlier patent which is designed to control a process of variable flow but constant volume. No such single variable can be pointed out at a variation of the volume which would apply to modelling of all flow characteristics and would have such a difference of its mutually independent values which could be used as the argument of the weighting function of the concentration process. At least the general nature of the flow characteristics has to be known and, correspondingly in the following, the control of the vessel of finite distribution of the flow velocity will be discussed first and subsequently the control of the perfectly mixing vessel.

In many vessels, the velocity of motion of liquid elements is distributed to both sides of a finite average value. It has been shown (A. J. Niemi, Mathl Comput. Modelling 11 (1988) pp. 32–37) that, if the flow pattern keeps unchanged, the average axial, relative displacement $x_{av}/L$ of the liquid elements, i.e. the average displacement $x_{av}$ proportional to the axial length L of the vessel, in the interval $v > t$, depends on the average velocity of motion and therefore on the gross flow Q and volume V. The following result is then valid, irrespective if the variation of the volume V(t) proceeds in the axial direction, perpendicularly to it or simultaneously in all directions.

$$\frac{x_{av}}{L} = \frac{\int_v^t Q_{in}(\mu)d\mu}{V(t)} \quad (1)$$

It has been shown in the above reference that, if the velocity of motion is distributed, the corresponding relative distribution $x/x_{av}$ of the location x depends at each time t on the quantity $x_{av}/L$. It has further been shown that the residence of liquid in a vessel of length L between the time of entrance $(v)$ and time of exit $(t)$ depends on the same quantity (1) which will be symbolized by z in the following.

It has been shown that many industrial continuous flow processes can be described by means of residence distributions p(z) which are based on this variable whereby the explicit time variable is eliminated from said descriptions. Examples of processes of this kind are the plug flow and laminar flow and, further on, the Gaussian velocity profile and, on certain conditions, the dispersion flow vessel. The description can be generalized to such vessels of arbitrary flow pattern in which the relative velocity profile may be different in different cross sections, especially in the neighbourhood of the vessel ends, but in which it anyway is continuously invariable in each individual cross section. Such a process needs not to have a closed mathematical model, while its flow pattern, i.e. typically its residence distribution, may be known e.g. numerically, through experiments and measurements.

The residence time distribution of the process, and its residence distribution presented in terms of z are, assuming that the other general conditions are satisfied, i.e. the flow pattern is unchanged and the variables and parameters which have not been singled out here are constant, also weighting functions of the concentration process. With their aid, the outlet concentration of the process can therefore in principle be computed assuming that the said distributions are known on the basis of theoretical or logical inference or of accomplished experiments or measurements. However, one cannot directly perceive, how such a computation is performed.

Two of the three variables, i.e. of the volume, inlet flow and outlet flow, may change freely, while the third one is determined by them. In the invented method, one requires that two of the said quantities are measured continuously or repeatedly. If the measured variables are the volume and inlet flow, the value of the variable z can be determined for each pair $(t,v)$, and further on, the value of the outlet concentration C at the time $t(z)$ on the basis of the inlet concentration $C_{in}$ ($i=1$):

$$C(z_i) = \int_{-\infty}^{z_i} C_{in}(\zeta_i) p(z_i - \zeta_i) d\zeta_i \ (i = 1,2) \quad (2)$$

$$C(t) = \int_{-\infty}^{t} C_{in}(v) p \left[ \frac{\int_v^t Q_{in}(\mu) d\mu}{V(t)} \right] \frac{Q_{in}(v)}{V(t)} dv \quad (3)$$

In the equation (2), z has been presented as the difference of its two factors:

$$z = \frac{1}{V(t)} \int_\eta^t Q_{in}(\mu) d\mu - \frac{1}{V(t)} \int_\eta^v Q_{in}(\mu) d\mu = z_1 - \zeta_1 \quad (4)$$

$\eta$ = fixed origin of time

Both equation (2) and (3) are applicable to the computation of the outlet concentration. It is essential, that the storing of a single function p only which is a function of one variable, in the memory is sufficient, in addition to that of the measured values of $C_{in}$ and $Q_{in}$ and V. Especially if the model of equation (2) is used, it is practical to perform the integration with regard to $\zeta_1$ with constant increments, in the decreasing direction. The corresponding increment of time is thereby obtained from the equation (5) and further on, $v$ by means of these increments, while the corresponding $C_{in}(v)$ [$=C_{in}(\zeta_1)$ which have not been distinguished above from each other]can be read or interpolated from the memory. The integration is finished when such low values of the time are reached which do not essentially influence the result anymore.

$$\Delta v = \frac{V(t)}{Q_{in}(v)} \Delta \zeta_1 \quad (5)$$

The above discussion of the process model was necessary, because the feedforward control method according to the invention exploits it. It is known from previous art that the effect of one disturbance variable can be eliminated completely by feedforward means, if the process model is accurately known. A method has been presented in the referenced patent for simultaneous elimination of another disturbance quantity. The previous art does not know a method which, in addition to the main disturbance quantity, would eliminate the effects of the two other disturbance quantities in the process, at least if this is to be done accurately.

Figure 1:
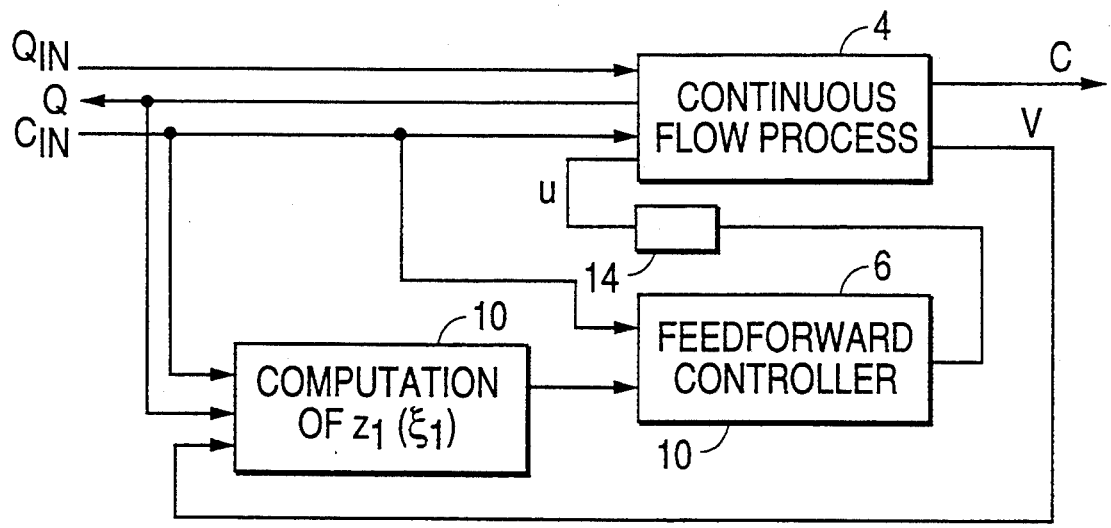
FIG. 1 shows a feedforward control loop of the present invention.

DESCRIPTION OF THE PREFERRED EMBODIMENTS;

FIG. 1 presents the feedforward control loop of a continuous flow process in which the present value and earlier values $\zeta_1$ of the variable $z_i$ are determined. In the case of a process with a finite distribution of the flow velocity $i=1$, and in the case of a well mixing process $i=2$. The controller determines the controlling quantity u as a function of this variable zi on the basis of the measured inlet concentration and directs this control to the process.

Figure 2:
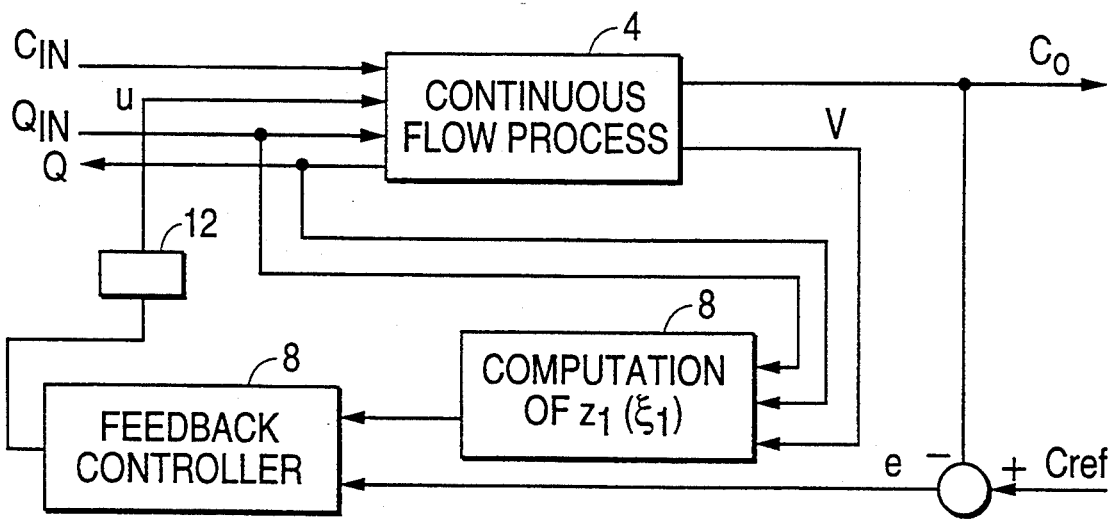
FIG. 2 shows a feedback control loop of the present invention.

FIG. 2 presents the feedback control loop of a continuous flow process. The variable $z_i(\zeta_1)$ is determined as in the case of FIG. 1. The controller 8 determines the controlling quantity u on the basis of the difference of the prescribed value and measured value of the outlet concentration.

The feedforward control method according to the invention presented in FIG. 1 thus requires that the main disturbance quantity, i.e. typically the variation of the inlet concentration, is measured by means of a suitable measuring device or analyzer and stored in the control device, i.e. in the control computer 10. Similarly it requires that the inlet flow and liquid volume of the vessel, 4 are measured and stored. On the basis of the these, the values of $z_1$ and $\zeta_1$ are then computed, and further on that of C(t), as presented above. The correction corresponding to the value $-C(t)$ is directed to the input or output point of the process or to a point between them, by means of a proportioning pump or other suitable actuator 14. With regard to the last alternative above, a reference is made to an earlier publication (A. J. Niemi, Proc. ISA Conf. 1978, Part II, pp. 63–68 & Proc. JACC 1978 Part I, pp. 37–42. ISA, Pittsburgh) in which a method has been presented for control of a process of constant parameters. This method can be logically augmented with the features according to the invention which take the variable inlet flow and volume into account.

The two quantities to be measured can also be chosen differently from the set of the volume and inlet and outlet flows, because these are connected by the following relationship:

$$\frac{dV(t)}{dt} = Q_{in}(t) - Q(t) \quad V(\eta) = V_\eta \tag{6}$$

If the flow $Q_{in}$ or volume $V$ which can be obtained also indirectly from the level height of liquid are not measured, it can always be calculated by means of the two other, measurable quantities from the equation (6) or from its integrated form. — If the inlet and outlet flows are measured continuously or repeatedly, the volume must anyway be also measurable, at least at longer intervals. Otherwise the systematic errors possibly present in the flow measurements may accumulate and gradually result in art essentially incorrect value of the volume. The updating of the initial value of the volume in the equation (6) corresponds to the above.

The invention relates also to the feedback control method. In this method, one controls, on the basis of the measured value of the output quantity which is typically the outlet concentration, the input quantity which is typically the input concentration, in such a manner that the previous one follows as accurately and stably as possible the prescribed value which can be chosen and adjusted by the user. This controller does not usually contain a process model according to the function p. Despite this, it can be expediently constructed for execution of the control actions as functions of z, without an explicit dependence on the time t.

In this method according to FIG. 2, one measures at least two of the quantities inlet flow, outlet flow and volume, simultaneously as they appear or are directed to the process. The measured signals are brought into the controller 8 and the dependence of equations (6) is used for calculation of $Q_{in}$ or V, as may be needed. The controller 8 first calculates the needed values of $z_1$ (and $\zeta_1$). By means of them and the deviation e which is the difference of the prescribed and outlet concentrations, it further on determines the needed control u and directs it to the process through a suitable actuator 12. The controller 8 may have the structure of any known feedback controller assuming this is able to operate with z as the argument instead of the time t. It may then be useful to determine the control with regard to $z_1$ with equal increments $\Delta\zeta_1$, and to accomplish the needed integrations in the direction of the decreasing value of the variable. Thus, e.g., the algorithm according to the general principle of the proportional, integral and derivative control or PID control determines the controlling variable as follows, with i=1:

$$u(z_i) = K_p e(z_i) + K_I \int_0^{z_i} e(\zeta_i) d\zeta_i + K_D \frac{de(z_i)}{dz_i} \quad (i = 1,2) \tag{7}$$

As now a process with constant parameters is controlled with a controller of constant coefficients, the closed control loop is invariant with regard to z. At the same time, it is linear due to the characteristic of the process and controller 8. For the design and tuning of the controller and i.a. for selection of values of its parameters $K_p$, $K_I$ and $K_D$, one may therefore use the design methods of linear constant coefficient systems which have been described in textbooks on control engineering, which are in general use and which have been described i.a. in the referred earlier patent. The controller 8 can be tuned also by experimentation, e.g. whenever the process model is not sufficiently accurately known. It is then useful although not necessary that the volume and flows are unchanged at the time of tuning of the controller. Whenever the volumes and flows afterwards change, the controller 8 takes the changes into account, and the resulting control is as good as when the volumes and flows are constant values.

The method can also be implemented with time as the independent variable. Especially in the case of PID control, one obtains, by means of the control function of equation (7) and equation (4) (i=1), the control function:

$$u(t) = K_p e(t) + \frac{K_I}{V(t)} \int_0^t e(v)Q_{in}(v)dv + K_D \frac{de(t)}{dt} \cdot \frac{V(t)}{Q_{in}(t)} \tag{8}$$

From the control functions of equation (7) and (8) one observes that if the flow $Q_{in}$ and volume V do not change but keep continuously to their nominal values, the controller in fact performs the integration and differentiation with regard to the normal time variable and thus operates as controller of other process quantities in same manner as the conventional PID controller. One observes further on, that the K-coefficients of the control functions can be calculated in a simple manner from the corresponding coefficients of the conventional control or from the coefficients which possibly have been used for control earlier, in which case they need not be retuned.

In a perfectly mixing vessel, the entering material is immediately mixed within the total material volume of the vessel. It has no finite velocity distribution and no such average value of the speed of propagation which could be defined. Instead of that, it can be described by an ordinary differential equation, also under variation of its parameters.

$$\frac{d[V(t)C(t)]}{dt} = Q_{in}(t)C_{in}(t) - Q(t)C(t) \tag{9}$$

The solution of the equation can be presented in the form of equation (2), while i=2 and p has the meaning according to equation (10) and z' that according to equation (11) which differs from that characterizing the process type of equation (4) discussed earlier.

$$p(z')dz' = e^{-z'}dz' \tag{10}$$

$$z' = \int_v^t \frac{Q_{in}(\mu)}{V(\mu)} d\mu = \int_\eta^t \frac{Q_{in}(\mu)}{V(\mu)} d\mu - \tag{11}$$

$$\int_\eta^v \frac{Q_{in}(\mu)}{V(\mu)} d\mu = z_2 - \zeta_2$$

The presented residence time distribution is simultaneously the weighting function of the concentration process. With its aid, one may determine the outlet concentration of the perfect mixer. In the method according to the invention, one requires that at least two of the quantities inlet concentration, outlet concentration and volume are measured continuously or repeatedly; the missing one can be determined by means of equation (6) as needed. The output quantity can be determined with either the time or the quantity $z'$ of equation (11) as the independent variable. Especially if the model of equation (2) is used, it is useful to perform the integration with regard to $z_2$ with equal intervals.

In the feedforward control method (FIG. 1) of also the ideal mixer or of a vessel with closely similar characteristics, one requires that the main disturbance quantity, typically the variation of the inlet concentration, is measured and stored in the control computer 10. Similarly one requires that the inlet flow and liquid volume are known through either mesurements or calculations. The output quantity C(t) is computed as presented above and the correction corresponding to its value is directed through an actuator 14 to the inlet or outlet point of the process or to a point between them. — The same additional comments which were above presented for the case of processes which had an invariable relative velocity distribution, apply also to the feedforward control of the perfectly mixing vessel.

The invention relates also to the feedback control method (FIG. 2) of the outlet concentration of the ideal mixer. Also, this kind of controller 8 which usually does not contain a process model p can be constructed to perform its control actions as functions of $z'$ as in equation (11), without an explicit dependence on the time t. Also, in this method according to FIG.2, one measures at least two of the variables inlet flow, outlet flow and volume and brings the measured singnals into the controller 8. After this has determined $z_2$, it determines the needed control u by means of $z_2$ and difference quantity e, and directs it to the process. The controller 8 may have a structure of any such known feedback controller which is able to operate with $z'$ as in equation (11) as the argument, instead of t. E.g., the PID control or PID control algorithm determines the controlling quantity according to equation (7) while i=2.

The feedback control of the ideal mixer is generally subject to the same comments which were above earlier presented in connection with feedback control of a vessel with invariable relative velocity distribution. Also this controller 8 can be constructed to accomplish its control actions as functions of the time whereby the PID algorithm obtains the following form on the basis of equation (11):

$$u(t) = K_p e(t) + K_I \int_0^t e(v) \frac{Q_{in}(v)}{V(v)} dv + \\ + K_D \frac{de(t)}{dt} \cdot \frac{V(t)}{Q_{in}(t)} \tag{12}$$

The presented control methods eliminate the effects of changes of volume and flow completely, in the control of the content of material or its other quality characteristic, if the process model is accurately known. With variation of volume, one can match the variation of the pressure in a gas tank in which the concentration of its outlet flow is being controlled. Hereby it may be beneficial to use mass flows instead of volumetric flows. With it, one can also match the variation of a fraction of solid material and thus of the mass of solid material in the solid/liquid suspension in a vessel of constant volume whereby the quantity to be controlled is a quality characteristic of solid material in the outlet flow.

If other physical processes also take place in the control object, in addition to variation of the concentration due to effects of volume, flow and mixing, the presented controllers eliminate only the effects of these stated variables. Such other process of the subject type may be, e.g., a thermal process or chemical reaction which proceeds depending on kinetic factors and is typically bound with the absolute time variable. Also in this kind of a case, the presented controllers bring an essential improvement with regard to the conventional control, since they eliminate the effects of the volume and flow. If the control is performed with regard to z, one has in any case often to often redetermine values of the time $v$ in which case the determination of the kinetic member for different increments of integration does not require any more essential additional work.

The presented control methods can be implemented in a straight-forward manner, if a computer is used as the controller. The presented computations are easily programmed, including the integration of primary measured variables and integration and differentiation of the control deviation or of other input quantities of the controller. The needed measuring devices and likewise the converters which bring the measured signals to digital form are known from previous art. Also a high number of actuators applicable to control of feed of chemicals is previously known, as well as digital-to-analog converters which transmit their control signals. The control computer which operates in real time may naturally serve also such additional control and other tasks which are independent of the controls presented here.

What is claimed is:

1. A method for incorporation of varying volume and flow in the control of other process variables in a continuous flow process, comprising the steps of:

measuring and storing at least two of the process variables of inlet flow ($Q_{in}$), outlet flow (Q) and volume (V);

determining a new variable (z) at time (t) wherein said new variable (z) is dependent on said at least two process variables;

determining an output quantity (u(t)) of a controller at the same time (t) based on the new variable (z) by using a method which is invariant with respect to the new variable (z); and controlling one or more of said other process variables by applying a signal representative of the determined output quantity (u(t)) to a means for controlling said other process variables.

2. The method of claim 1, wherein the step of determining a new variable (z) includes the steps of integrating the inlet flow ($Q_{in}$) with respect to time up to a time (t) and dividing the integrated inlet flow by the volume V(t) at the same time (t).

3. The method of claim 2, wherein the step of determining the output quantity (u(t)) comprises the step of determining the output quantity (u(t)) based on a difference between a prescribed value ($C_{ref}$) of the output quantity and a measured value ($C_o$) of the output quantity; wherein a) said difference is multiplied by a first coefficient;
b) said difference is multiplied by the value of the inlet flow, the product is integrated with respect to time up to a time (t), the result of the integration is divided by the volume (V(t)), and the quotient is multiplied by a second coefficient, c) said difference is differentiated with respect to the time (t), the derivative is multiplied by the value of the volume V(t), the product is divided by the value of the inlet flow at the same time (t), and the quotient is multiplied by a third coefficient, and d) the results obtained either in a) and b) or in a) and c) or in a), b) and c) are summed up, the coefficients stated in a), b) and c) being constants or slowly changing quantities.

4. The method of claim 1, wherein the step of determining a new variable (z) includes the steps of dividing the inlet flow ($Q_{in}$) by the volume (V) and integrating the quotient with respect to time up to the time (t).

5. The method of claim 4, wherein the step of determining the output quantity (u(t)) comprises the step of determining the output quantity (u(t)) based on a difference between a prescribed value ($C_{ref}$) of the output quantity and a measured value ($C_o$) of the output quantity; wherein a) said difference is multiplied by a first coefficient, b) said difference is multiplied by the value of the inlet flow, the product is divided by the value of the volume, the quotient is integrated with respect to time up to a time (t), the result of the integration is multiplied by a second coefficient, c) said difference is differentiated with respect to the time (t), the derivative is multiplied by the value of the volume (V(t)), the product is divided by the value of the inlet flow at the same time (t), and the quotient is multiplied by a third coefficient, and d) the results obtained either in a) and b) or in a) and c) or in a), b) and c) are summed up, the coefficients stated in a), b) and c) being constants or slowly changing quantities.

6. A method for incorporation of varying mass and flow in the control of other process variables in a continuous flow process in a gas vessel of constant volume comprising the steps of:

measuring and storing at least two of the process variables of inlet flow, outlet flow and mass or pressure, determining a new variable by integrating the inlet flow with respect to time up to a time (t) and then dividing the integrated value by a quantity that is proportional to the mass at the same time (t);

determining an output quantity of a controller at the same time (t) based on the new variable and using a method which is invariant with respct to the new variable; and controlling one or more of said other process variables by applying a signal representative of the determined output quantity to a means for controlling said other process variables.

7. The method of claim 6, wherein the step of determining the output quantity includes the step of determining the output quantity based on a difference between a prescribed value of the output quantity and a measured value of the output quantity; wherein a) said difference is multiplied by a first coefficient, b) said difference is multiplied by the value of the inlet flow, the product is integrated with respect to time up to a time (t), the result of integration is divided by the value of the pressure at the same time (t) and the quotient is multiplied by a second coefficient, c) said difference is differentiated with respect to the time (t), the derivative is multiplied by the value of the pressure at the same time (t), the product is divided by the value of the inlet flow at the same time (t), and the quotient is multiplied by a third coefficient, and d) the results obtained either in a) and b) or in a) and c) or in a), b) and c) are summed up, the coefficients stated in a), b) and c) being constants or slowly changing quantities.

8. A method for incorporation of varying mass and flow in the control of other process variables in a continuous flow process in a gas vessel of constant volume comprising the steps of:

measuring and storing at least two of the process variables of inlet flow, outlet flow and mass or pressure, determining a new variable by dividing the inlet flow by a quantity which is proportional to the mass and integrating the quotient with respect to time up to a time (t);

determining an output quantity of a controller at the same time (t) based on the new variable and using a method which is invariant with respect to the new variable; and controlling one or more of said other process variables by applying a signal representative of the determined output quantity to a means for controlling said other process variables.

9. The method of claim 8, wherein the step of determining the output quantity includes the step of determining the output quantity based on a difference between a prescribed value of the output quantity and a measured value of the output quantity; wherein a) said difference is multiplied by a first coefficient, b) said difference is multiplied by the value of the inlet flow, the product is divided by the value of the pressure, the quotient is integrated with respect to time up to a time (t), and the result of integration is multiplied by a second coefficient, c) said difference is differentiated with respect to the time (t), the derivative is multiplied by the value of the pressure at the same time (t), the product is divided by the value of the inlet flow at the same time (t), and the quotient is multiplied by a third coefficient, d) the results obtained either in a) or b) or in a) and c) or in a), b) and c) are summed up, the coefficients stated in a), b) and c) being constants or slowly changing quantities.

10. An apparatus for incorporation of varying volume and flow in the control of other process variables in a continuous flow process, comprising:

means for measuring and storing at least two of the process variables of inlet flow ($Q_{in}$), outlet flow (Q) and volume (V);

means for determining a new variable (z) at time (t) wherein said new variable (z) is dependent on said at least two process variables;

means for determining an output quantity (u(t)) of a controller at the same time (t) based on the new variable (z) by using a method which is invariant with respect to the new variable (z); and means for controlling said other process variables based on the determined output quantity (u(t)).

11. The apparatus of claim 10 wherein the means for determining the output quantity (u(t)) includes means for determining the output quantity (u(t)) based on a difference between a prescribed value ($C_{ref}$) of the output quantity and a measured value ($C_o$) of the output quantity; wherein a) said difference is multiplied by a first coefficient;
b) said difference is multiplied by the value of the inlet flow, the product is integrated with respect to time up to a time (t), the result of the integration is divided by the volume (V(t)), and the quotient is multiplied by a second coefficient;
c) said difference is differentiated with respect to the time (t), the derivative is multiplied by the value of the volume V(t), the product is divided by the value of the inlet flow at the same time (t), and the quotient is multiplied by a third coefficient; and
d) results obtained in either in a) and b) or in a) and c) or in a), b) and c) are summed up, the coefficients stated in a), b) and c) being constants or slowly changing quantities.

12. The apparatus of claim 10 wherein said means for determining the output quantity (u(t)) includes means for determining the output quantity (u(t)) based on a difference between a prescribed value ($C_{ref}$) of the output quantity and a measured value ($C_o$) of the output quantity; wherein
a) said difference is multiplied by a first coefficient,
b) said difference is multiplied by the value of the inlet flow, the product is divided by the value of the volume, the quotient is integrated with respect to time up to a time (t), the result of the integration is multiplied by a second coefficient,
c) said difference is differentiated with respect to the time (t), the derivative is multiplied by the value of the volume (V(t)), the product is divided by the value of the inlet flow at the same time (t), and the quotient is multiplied by a third coefficient, and
d) the results obtained either in a) and b) or in a) and c) or in a), b) and c) are summed up, the coefficients stated in a), b) and c) being constants or slowly changing quantities.

13. An apparatus for incorporation of varying mass and flow in the control of other process variables in a continuous flow process in a gas vessel of constant volume, comprising:
means for measuring and storing at least two of the process variables of inlet flow, outlet flow and mass or pressure;
means for determining a new variable by integrating the inlet flow with respect to time up to a time (t) and then dividing the integrated value by a quantity that is proportional to the mass at the same time (t);
means for determining an output quantity of a controller at the same time (t) based on the new variable by using a method which is invariant with respect to the new variable; and
means for controlling said other process variables based on the determined output quantity.

14. An apparatus for incorporation of varying mass and flow in the control of other process variables in a continuous flow process in a gas vessel of constant volume, comprising:
means for measuring and storing at least two of the process variables of inlet flow, outlet flow and mass or pressure;
means for determining a new variable by dividing the inlet flow by a quantity which is proportional to the mass and integrating the quotient with respect to time up to a time (t);
means for determining an output quantity of a controller at the same time (t) based on the new variable by using a method which is invariant with respect to the new variable; and
means for controlling said other process variables based on the determined output quantity.

* * * * *